(12) United States Patent
Barker

(10) Patent No.: US 10,167,888 B2
(45) Date of Patent: Jan. 1, 2019

(54) MULTI-ORIENTABLE STRUT CHANNEL SUPPORT SYSTEM

(71) Applicant: Shon E. Barker, Cameron, LA (US)

(72) Inventor: Shon E. Barker, Cameron, LA (US)

( * ) Notice: Subject to any disclaimer, the term of this patent is extended or adjusted under 35 U.S.C. 154(b) by 0 days.

(21) Appl. No.: 15/656,233

(22) Filed: Jul. 21, 2017

(65) Prior Publication Data

US 2018/0187413 A1 Jul. 5, 2018

Related U.S. Application Data

(60) Provisional application No. 62/440,183, filed on Dec. 29, 2016.

(51) Int. Cl.
| | |
|---|---|
| *F16B 7/18* | (2006.01) |
| *E04B 1/58* | (2006.01) |
| *E04B 1/41* | (2006.01) |
| *E04B 1/19* | (2006.01) |
| *E04C 3/04* | (2006.01) |
| *E04B 1/24* | (2006.01) |

(52) U.S. Cl.
CPC ............ *F16B 7/187* (2013.01); *E04B 1/1903* (2013.01); *E04B 1/40* (2013.01); *E04B 1/5818* (2013.01); *F16B 7/182* (2013.01); *F16B 7/185* (2013.01); *E04B 2001/2415* (2013.01); *E04C 2003/0413* (2013.01); *E04C 2003/0417* (2013.01); *E04C 2003/0439* (2013.01)

(58) Field of Classification Search
CPC ........ E04B 1/5818; E04B 1/40; E04B 1/1903; E04B 1/24; E04B 2001/2415; E04B 1/3448; E04C 2003/0417; E04C 2003/0439; E04C 2003/0413; E04C 3/00; F16B 7/182; F16B 7/185; F16B 7/187

USPC ... 52/655.1, 653.2, 843, 844, 845, 846, 848, 52/849, 641, 645; 403/337, 340
See application file for complete search history.

(56) References Cited

U.S. PATENT DOCUMENTS

| | | | | |
|---|---|---|---|---|
| 4,159,758 A | * | 7/1979 | Courson | ................. B66B 23/22 198/335 |
| 4,469,014 A | * | 9/1984 | Nelson | .................... F15B 15/24 403/337 |

(Continued)

FOREIGN PATENT DOCUMENTS

| | | | | |
|---|---|---|---|---|
| DE | 10114885 C1 | * | 7/2002 | ........... E03D 11/143 |
| EP | 1396645 A1 | * | 3/2004 | ............ F16B 7/0486 |

*Primary Examiner* — Adriana Figueroa
*Assistant Examiner* — Jessie T Fonseca

(57) ABSTRACT

A strut channel support system including a first brace, a second brace, and a fastening mechanism connects at least two channel struts in a multi-orientable fashion. The first brace and the second brace both possess a U-shaped channel, a base, a fastener-engagement point, and a strut-engagement point. The base is terminally connected to the U-shaped channel, the fastener-engagement point is centrally integrated into the base, and the strut-attachment feature is integrated into the U-shaped channel. This permits the base to retain the rear portion of a strut channel. The U-shaped channel perimetrically braces the lateral sides of the strut channel. The first brace and the second brace attach to each other via the fastener-engagement point. The fastener-engagement point of the first brace and the fastener-engagement point of the second brace are mechanically coupled to each other. This enables a user to adjust the orientation between at least two strut channels.

1 Claim, 8 Drawing Sheets

(56) References Cited

U.S. PATENT DOCUMENTS

| | | | | |
|---|---|---|---|---|
| 6,681,538 B1* | 1/2004 | Sarkisian | ............. | E04B 1/2403 403/335 |
| 7,568,856 B2* | 8/2009 | Wu | ............. | B62D 21/14 280/789 |
| 7,644,962 B2* | 1/2010 | Crouse | ............. | F16L 23/032 285/405 |
| 7,739,841 B1* | 6/2010 | Puckett | ............. | E04B 1/24 52/639 |
| 7,762,038 B2* | 7/2010 | Ceba | ............. | E04B 1/2403 52/653.1 |
| 7,793,981 B2* | 9/2010 | Xie | ............. | B62D 21/02 280/785 |
| 8,863,438 B1* | 10/2014 | Seitz | ............. | E06B 3/01 49/197 |
| 9,879,414 B2* | 1/2018 | Xykis | ............. | E04B 1/34384 |
| 2002/0162296 A1* | 11/2002 | Fernandez Marin | ..... | E04B 1/18 52/848 |
| 2004/0093825 A1* | 5/2004 | Lee | ............. | E04B 1/24 52/843 |
| 2010/0086348 A1* | 4/2010 | Funahashi | ............. | H02G 3/0456 403/306 |
| 2012/0233945 A1* | 9/2012 | Rubel | ............. | E04B 1/24 52/236.3 |
| 2012/0291261 A1* | 11/2012 | Davis | ............. | F16B 12/50 29/525.01 |
| 2016/0333582 A1* | 11/2016 | Xykis | ............. | E04C 3/08 |

\* cited by examiner

MULTI-ORIENTABLE STRUT CHANNEL SUPPORT SYSTEM

The current application claims a priority to the U.S. Provisional Patent application Ser. No. 62/440,183 filed on Dec. 29, 2016.

FIELD OF THE INVENTION

The present invention generally relates to a strut channel support system. In particular, a first brace and a second brace retain at least two strut channels in a multi-orientable configuration. A fastening mechanism fitted onto the first brace and the second brace locks the orientation of the at least two strut channels.

BACKGROUND OF THE INVENTION

People are often looking at ways to improve construction methods. Building tall structures that are able to withstand the test of time, has been a goal of humanity since the beginning of time. Modern skyscrapers are designed to not only show the advancement of technology but also to display the economic and industrial power of a nation. One of the oldest structures that are still standing today, is the Red Pyramid, located in Cairo Egypt. At one hundred and five meters, it is the tallest of the three pyramids built around 2600 BC. Currently, the tallest man-made structure in the world is the Burj Khalifa standing at 829.8 meters. It is more than eight times higher than the Red Pyramid, this accomplishment is mostly due to advanced building techniques, modern technology, and modern materials available now.

While the pyramids are largely built out of limestone, skyscrapers use a plurality of materials such as aluminum, reinforced concrete and glass. Modern building methods rely on modular superstructures that are constructed using reinforced concrete and aluminum. The development of metal framing systems allowed people to build taller and safer structures. A plurality of structures can be used depending on the requirements of each project. Brackets and attachment systems are continuously developing. Welding is commonly used when building support structures, in certain applications however, welding is not a viable option, thus different attachment support methods are necessary. For example, when building a bridge over a body of water, welding the structure under the water would require hyperbaric welding, a process that can be very hazardous, and costly to implement.

The present invention aims to solve the problems mentioned above, by utilizing a first brace and a second brace that can be connection to multi-orientable configurations. The first brace and the second brace are versatile and allow for strut channels to be connected in a rotatable, offsetting, and hinged configuration. Usually fixed brackets are limited by the initial angle included in the construction design. The present invention can be adapted to a plurality of structures, without the requirement for permanent attachment methods to the structure, making disassembly much easier for the user if necessary.

DETAILED DESCRIPTION OF THE INVENTION

All illustrations of the drawings are for the purpose of describing selected versions of the present invention and are not intended to limit the scope of the present invention.

Figure 1:
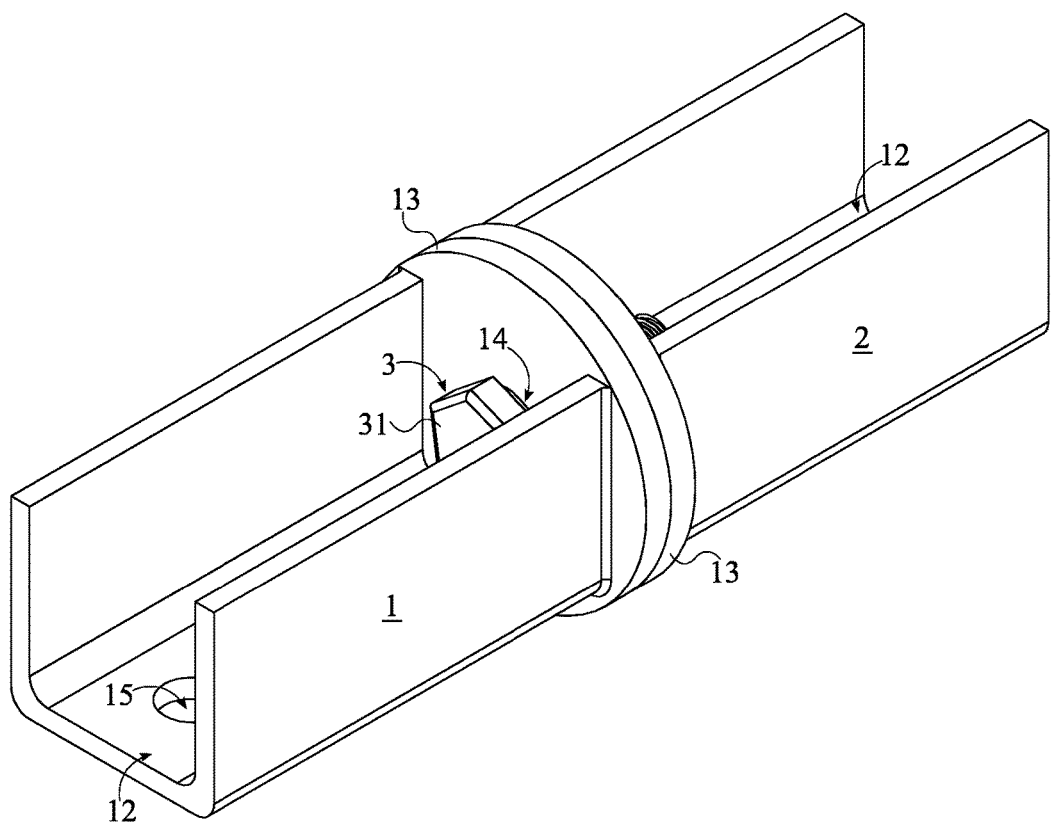
FIG. 1 is a front perspective view of the first brace and the second brace in a rotational configuration.
Figure 2:
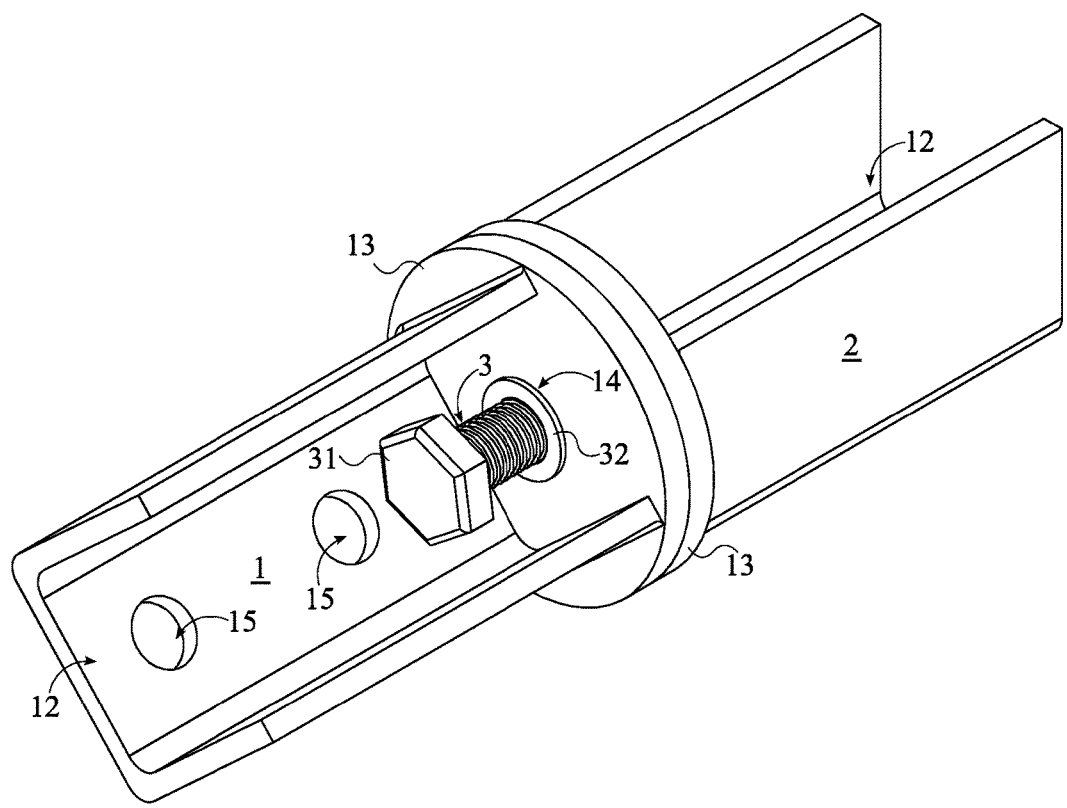
FIG. 2 shows the present invention in a rotational configuration with the front brace rotating in relation to the second brace.

In reference to FIG. 1-FIG. 2, the present invention is a strut channel support system. The present invention allows one or more strut channels to connect in a multi-orientable fashion. It is also possible to use the present invention to connect at least two double strut channels. The preferred embodiment of the present invention comprises a first brace 1, a second brace 2, and a fastening mechanism 3. The fastening mechanism 3 creates a multi-orientable connection between the first brace 1 and the second brace 2. Once the desired orientation is achieved, the fastening mechanism 3 locks in position. Single strut channels are longitudinally mounted into the first brace 1 and the second brace 2. Double strut channels can also be longitudinally mounted into the first brace 1 and the second brace 2. In order to do so, the first brace 1 and the second brace 2 each comprise a U-shaped channel 12, a base 13, a fastener-engagement point 14, and a strut-attachment feature 15.

Referring to FIG. 1, the U-shaped channel 12 perimetrically engages the polygonal cross-section found in conventional strut channels. Thus, the U-shaped channel 12 allows the first brace 1 and the second brace 2 to laterally mount to the strut channel. The base 13 is terminally connected to the U-shaped channel 12. In the preferred implementation of the present invention, the strut channel is terminally mounted into the U-shaped channel 12. Thus, the base 13 can be thought of as a barrier that secures the terminal portion of the strut channel within the first brace 1 and the second brace 2. The fastener-engagement point 14 is centrally integrated into the base 13, which permits the fastening mechanism 3 to mount onto the first brace 1 and the second brace 2. The strut-attachment feature 15 is integrated into the U-shaped channel 12. This enables the strut channel to be fixedly mounted into the U-shaped channel 12. The fastener-engagement point 14 of the first brace 1 and the fastener-engagement point 14 of the second brace 2 are mechanically coupled to each other by the fastening mechanism 3. The fastening mechanism 3 affixes the fastener-engagement point 14 of the first brace 1 and the fastener-engagement point 14 of second brace 2 together. In particular, the fastener-engagement point 14 of the first brace 1 and the fastener-engagement point 14 the second brace 1 rest adjacent to each other.

As can be seen in FIG. 2, an object of the present invention is to create a multi-orientable connection between the terminal portions of at least two strut channels. In one possible configuration, the terminal portions of the strut channels are rotatably connected to each other. This requires the first brace 1, the second brace 2, and the fastening mechanism 3 to be arranged into a rotational configuration. The rotational configuration allows the first brace 1 to rotate in relation to the second brace 2. Once the desired angular displacement is achieved, the first brace 1 and the second brace 2 can be locked in position. The base 13 of the first brace 1 is positioned parallel and adjacent to the base 13 of the second brace 2. Both the first brace 1 and the second brace 2 each include a rotation axis that is oriented normal to the base 3. In the rotation configuration, the first brace 1 and the second brace 2 are oriented in a manner which prohibits translational movement. Consequently, the first brace 1 and the second brace 2 can only rotate about each other. This orientation is secured when the base 13 of the first brace 1 and the base 13 of the second brace 2 is pressed against each other by the fastening mechanism 3. A user can adjust the angular displacement between the first brace 1 and the second brace 2 by disengaging the fastening mechanism 3 and rotating the first brace 1 in relation to the second brace 2.

Referring once more to FIG. 2, the rotational configuration utilizes a fastening mechanism 3 comprising a single fastener 31 and a washer 32. The washer 32 is positioned adjacent to the base 13 of the first brace 1, opposite to the base 13 of the second brace 2. The single fastener 31 traverses through the washer 32 and interlocks through the fastener-engagement point 14 of the first brace 1 and to the fastener-engagement point 14 of the second brace 2. In the preferred embodiment, the single fastener 31 is a threaded bolt. The fastener-engagement point 14 of the first brace is a simple hole that allows the bolt to traverse there through. The second brace 2 utilizes a fixed nut mounted concentrically with a hole as the preferred fastener-engagement point 14. The bolt inserts through the hole and the fixed nut in the second brace 2. A threaded hole fashioned into the fixed nut interlocks with the threads on the bolt. This secures the single fastener 31 within the fastener-engagement point 14. Alternate embodiments of the fastening mechanism 3 may utilize a snap-fit lock, magnetic fasteners, chemical adhesives, or any other selectively fastening mechanism considered appropriate. The bolt head is generally composed of a very hard material that can damage the base 13, which is made of a softer material. Thus, the washer 32 is placed between the bolt head and the base 13 of the first brace 1 to protect the base 13 from the bolt head. The single fastener 31 thus forms a selective coupling between the first U-shaped channel 12 and the second U-shaped channel 12.

Figure 3:
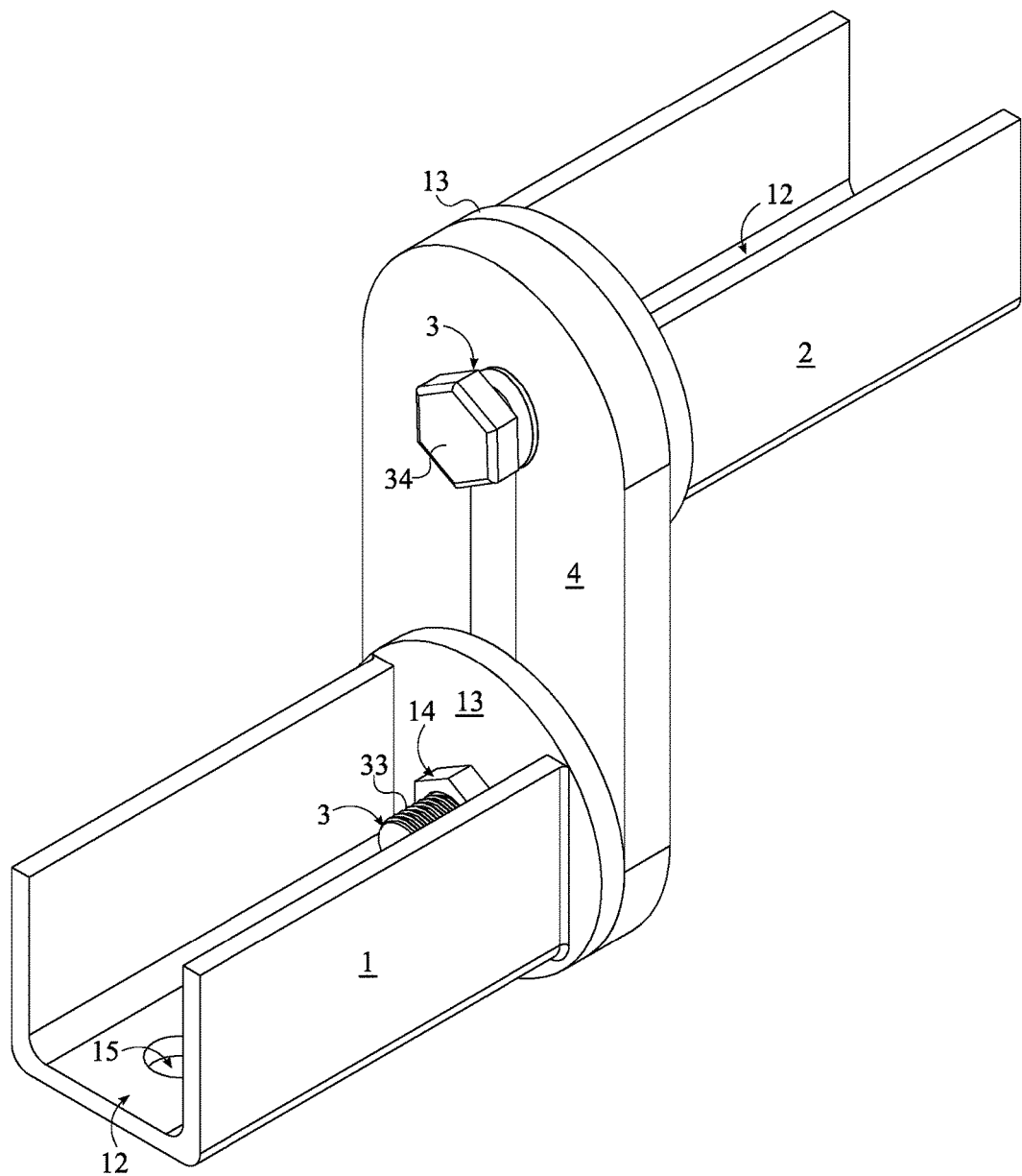
FIG. 3 shows a front perspective view of the front brace and second brace engaged together in an offsetting configuration.
Figure 4:
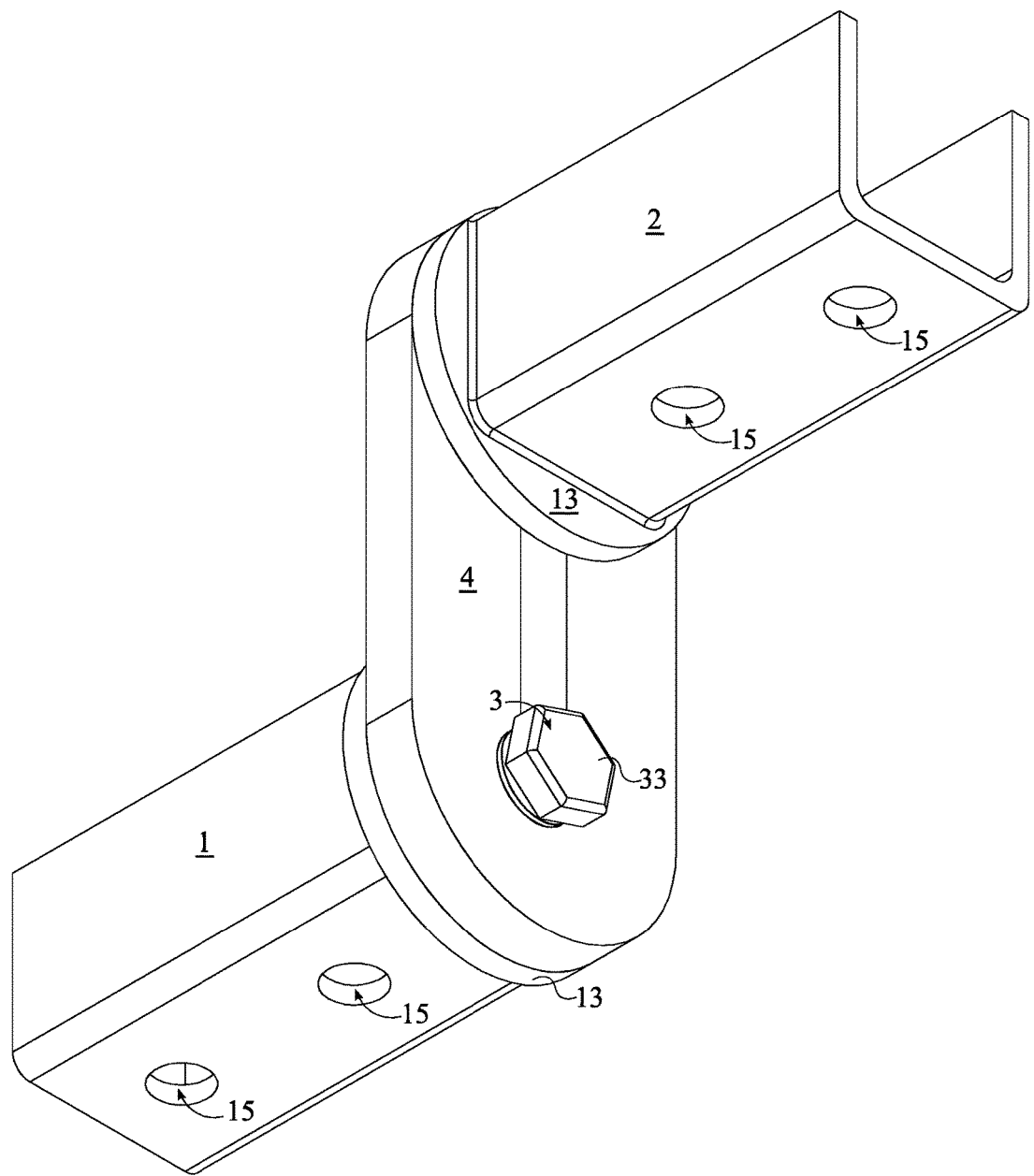
FIG. 4 shows a rear perspective view of the front brace and second brace engaged together in an offsetting configuration.

In reference to FIG. 3-FIG. 4, in another embodiment of the present invention, the first brace 1, the second brace 2, and the fastening mechanism 3 are arranged into an offsetting configuration. The offsetting configuration utilizes an oblong plate 4 to linearly offset the first brace 1 from the second brace 2. At one side of the oblong plate 4, the single fastener 31 connects to the first base 13. In order to do so, the base 13 of the first brace 1 is attached adjacent and parallel onto the oblong plate 4 by the fastening mechanism 3. At the opposite side, the base 13 of the second brace 2 is positioned adjacent and parallel onto the oblong plate 4 by the fastening mechanism 3. This allows the first brace 1 to vertically or horizontally offset from the second base 13, or vice versa.

As can be seen in FIG. 3, in the offsetting position, the first brace 1 and the second brace 2 are positioned at opposite ends of the oblong plate 4. The fastening mechanism 3 for the offsetting configuration comprises a first fastener 33 and a second fastener 34. The first fastener 33 attaches through the oblong plate 4 and the fastener engagement point 14 of the first brace of the first brace 1. The second fastener 34 attaches through the oblong plate 4 and the fastener-engagement point 14 of the second brace 2. This arrangement allows the first brace 1 and the second brace 2 to mount onto the distal ends of the oblong plate 4. In the preferred implementation of fastening mechanism 3 for the offsetting configuration, the first fastener 33 and the second fastener 34 are bolts and the fastener-engagement point 14 is a hole and threaded bolt integrated into the base 13. The first fastener 33 and the second fastener 34 traverse through the elongated slot and engage the fastener-engagement point of the first brace 1 and the fastener-engagement point 14 of the second brace 2 resting on opposite sides of the oblong plate 4. A set of washers 331 separate the oblong plate from first fastener 33 and the second fastener 34. The set of washers 331 prevent the first fastener and the second fastener from scratching the lateral surfaces of the oblong plate 4. A user can loosen the first fastener 33 to move the first brace 1 along the elongated slot. Likewise, the user can adjust the position of the second brace 2 along the elongated slot by loosening the second fastener 34.

As can be seen in FIG. 4, the preferred embodiment of the present invention comprises a strut support system, wherein a central axis of the U-shaped channel 12 is oriented normal to the base 13. This allows the strut support to mount perpendicularly to the base 13 and preserves a straight orientation between the strut supports mounted in the first base 13 and in the second base 13.

Figure 5:
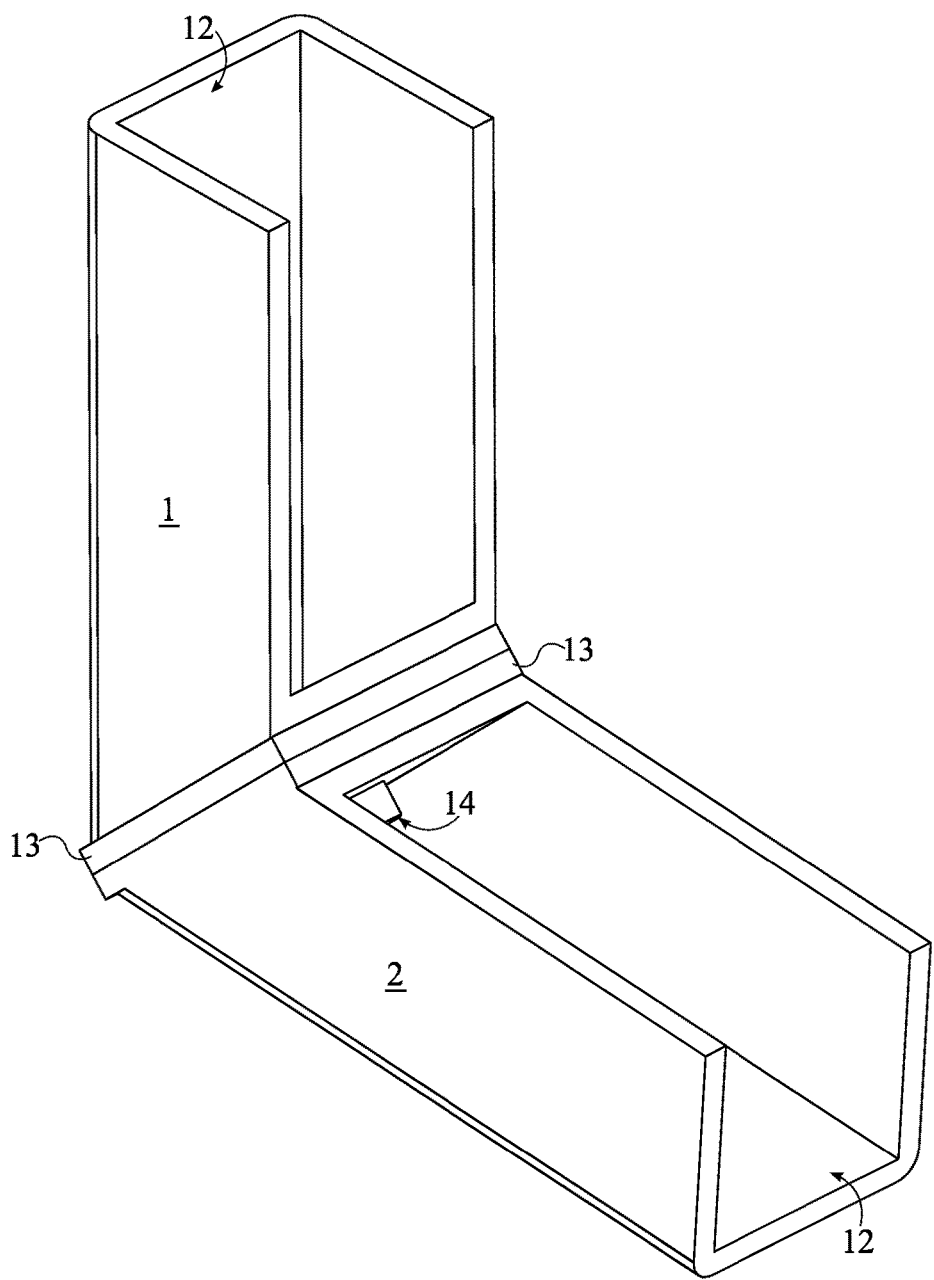
FIG. 5 shows an angular offset between the first brace and the second brace.
Figure 8:
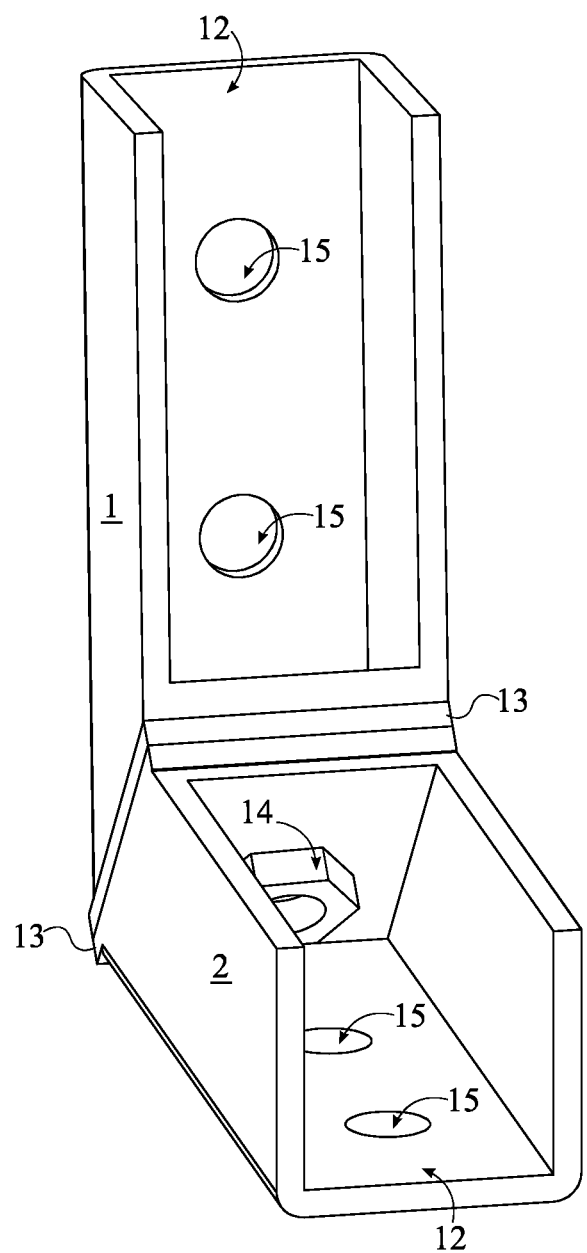
FIG. 8 is a front perspective view of the angular offset between the first brace and the second brace.

In reference to FIG. 5 and FIG. 8, in another embodiment of the present invention, the central axis of the U-shaped channel 12 is oriented to the base 13 at an acute angle. This offsets the angle between the first brace 1 and the second brace 2 while keeping the first brace 1 and the second brace 2 in a coplanar orientation. The offset may be any acute angle that creates the desired orientation between the U-shaped channel 12 and the base 13. But in the preferred implementation, the acute angle is 45 degrees. Once the desired offset angle is achieved, the first brace 1 and the second brace 2 may be connected using a variety of fastening mechanisms, such as but not limited to, nuts-and-bolts, snap fasteners, magnetic fasteners, and the like.

Figure 6:
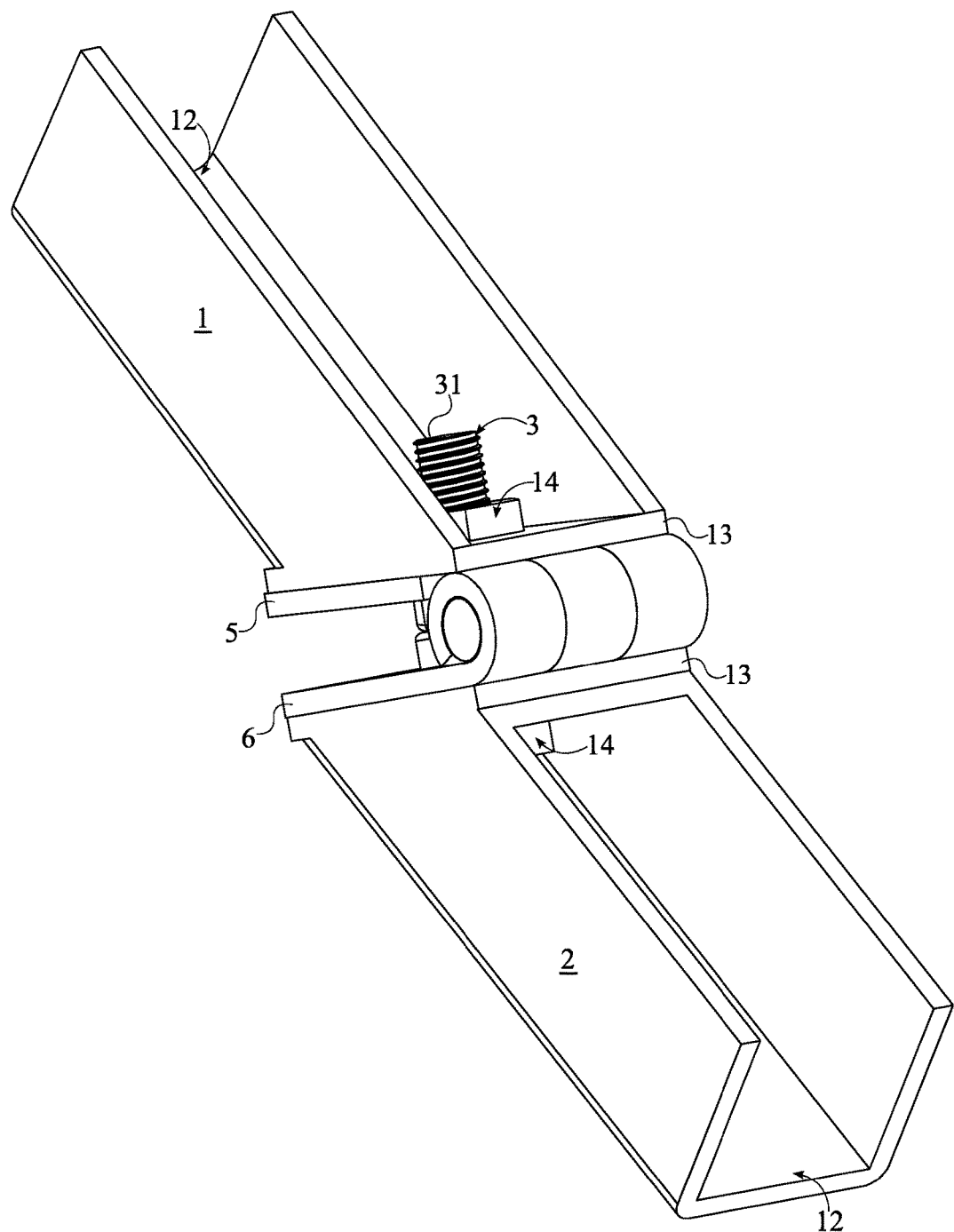
FIG. 6 shows the first brace, the second brace, the first plate, and the second plate configured in a hinged configuration with no angular offset.
Figure 7:
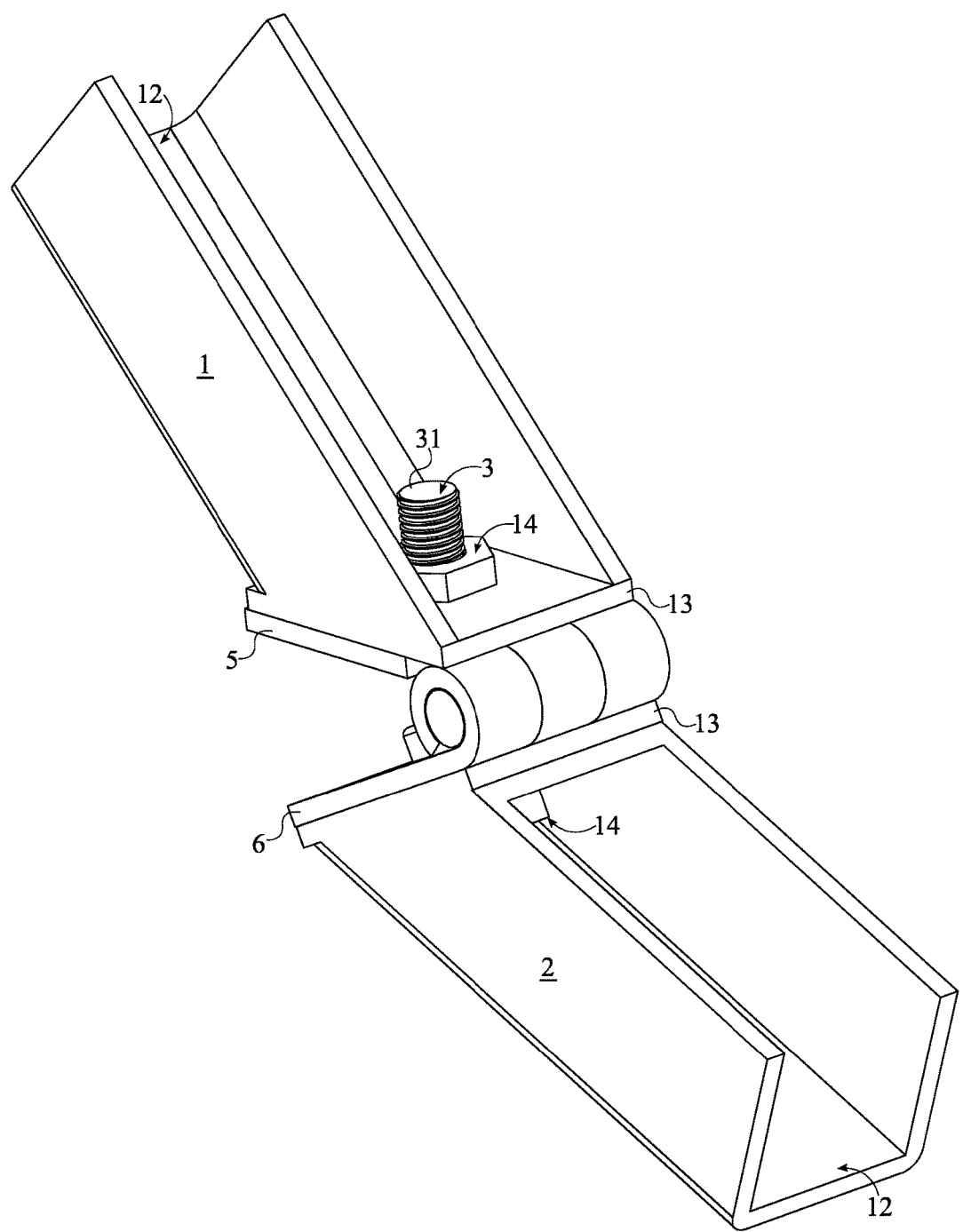
FIG. 7 shows the hinged configuration adjusted to have an angular offset.

In reference to FIG. 6-FIG. 8, in yet another embodiment of the present invention, the first brace 1, the second brace 2, and the fastening mechanism 3 are arranged into a hinged configuration. The hinged configuration creates a pivotal engagement between the first brace 1 and the second brace 2 while retaining a coplanar orientation. To do so, the present invention utilizes a hinge that rotatably connects the first brace 1 to the second brace 2, and thus enables the two strut channels to rotate in relation to each other. The hinge hingedly connects the first plate 5 and a second plate 6 used to retain the first brace 1 and the second brace 2. The hinged connection is made possible through a plurality of sectional barrels divided between the first plate 5 and the second plate 6. The sectional barrels of the first plate 5 and the second plate 6 are lined up concentrically then the pivot pin is inserted therein. The pivot pin preserves the first plate 5 and the second plate 6 in translational equilibrium, preventing movement in the vertical or horizontal direction. However, translational equilibrium allows the rotation about the pivot pin. Thus, the first plate 5 can rotate in relation to the second plate 6.

Referring to FIG. 7, the hinged configuration allows the user to adjust the angular offset between the first brace 1 and the second brace 2. To do so, the base 13 of the first brace 1 is attached adjacent and parallel onto the first plate 5 by the fastening mechanism 3. The base 13 of the second brace 2 is attached adjacent and parallel onto the second plate 6 by the fastening mechanism 3. In the hinged configuration, the fastening mechanism 3 comprises a first fastener 33 and a second fastener 34. Both the first fastener 33 and the second fastener 34 are bolts capable of selectively coupling with the fastener-engagement point 14 of the first brace 1 and with the fastener-engagement point 14 of the second brace 2. To mount the first brace 1, the first fastener 33 is attached through the first plate 5 and the fastener-engagement point 14 of the first brace 1. To mount the second brace 2, the second fastener 34 is attached through the second plate 6 and the fastener-engagement point 14 of the second brace 2.

As can be seen in FIG. 8, a plurality of attachment points is distributed longitudinally along the strut channel. The first brace 1 and the second brace 2 both comprise a strut-attachment feature 15 capable of selectively coupling with the plurality of attachment points. The preferred strut-attachment feature 15 is a pair of holes 8 traversing through the U-shaped channel 12. The pair of holes 8 is positioned parallel to the base 13. The strut channel is inserted perimetrically into the U-shaped channel 12, aligning the pair of holes 8 to the at least two of the plurality of attachment points. Once in the proper position, a fastener is inserted into each of the plurality of attachment points to secure the strut channel into the U-shaped channel 12. The fastener may be a screw, bolt, or any other suitable fastener.

Although the invention has been explained in relation to its preferred embodiment, it is to be understood that many other possible modifications and variations can be made without departing from the spirit and scope of the invention as hereinafter claimed.

What is claimed is:

1. A strut channel support system comprising:
   a first brace;
   a second brace;
   a fastening mechanism;
   an oblong plate;
   the first brace and the second brace being arranged on the oblong plate in an offsetting configuration so as to render the first brace and the second brace not aligning with each other;
   the first brace and the second brace each comprising a U-shaped channel, a base, a fastener-engagement point and a strut-attachment feature,
   the base being terminally connected to the U-shaped channel,
   a central axis of the U-shaped channel being oriented normal to the base, the fastener-engagement point being centrally integrated into the base,
   the strut-attachment feature being integrated into the U-shaped channel, the strut-attachment feature being a pair of holes, the pair of holes traversing through the U-shaped channel;
   the fastening mechanism comprising a first fastener and a second fastener;
   the base of the first brace being attached onto the oblong plate by the first fastener;
   the base of the first brace being parallel with the oblong plate;
   the base of the second brace being attached onto the oblong plate by the second fastener;
   the base of the second brace being parallel with the oblong plate;
   the oblong plate being located in between the base of the first brace and the base of the second brace;
   the first fastener traversing through the oblong plate and the fastener-engagement point of the first brace; and
   the second fastener traversing through the oblong plate and the fastener-engagement point of the second brace.

* * * * *